United States Patent [19]

Henze et al.

[11] Patent Number: 5,057,986
[45] Date of Patent: Oct. 15, 1991

[54] ZERO-VOLTAGE RESONANT TRANSITION SWITCHING POWER CONVERTER

[75] Inventors: Christopher P. Henze, Lakeville; David S. Lo, Burnsville, both of Minn.; Hubert C. Martin, Jr., Temecula, Calif.

[73] Assignee: Unisys Corporation, Blue Bell, Pa.

[21] Appl. No.: 492,708

[22] Filed: Mar. 12, 1990

[51] Int. Cl.$^5$ .......................................... H02M 3/335
[52] U.S. Cl. .......................................... 363/20; 363/21
[58] Field of Search ....................... 363/16, 17, 19, 20, 363/21, 97, 98, 131, 132

[56] References Cited

U.S. PATENT DOCUMENTS

| | | | |
|---|---|---|---|
| 4,618,919 | 10/1986 | Martin, Jr. | 363/21 |
| 4,857,822 | 8/1989 | Tabisz et al. | 363/16 X |
| 4,953,068 | 8/1990 | Henze | 363/17 |
| 4,975,821 | 12/1990 | Lethellier | 363/21 |

OTHER PUBLICATIONS

"Zero-Voltage Switching in High Frequency Power Converters Using Pulse Width Modulation", APEL Record, Feb. 1-5, 1988, Henze et al., pp. 1-8.
"Development of a DC-to-DC Power Converter for Distributed Power Processing", Lo et al., APEC Conference Record, Mar. 13-19, 1989, pp. 1-10.

Primary Examiner—Steven L. Stephan
Assistant Examiner—Emanuel Todd Voeltz
Attorney, Agent, or Firm—Arnold L. Albin; Glenn W. Bowen; Mark T. Starr

[57] ABSTRACT

A single-ended DC-to-DC power converter which is operative at very high switching frequencies with zero-voltage resonant transition switching. A single magnetic element functions as both a storage inductor and a transformer. A charging capacitor is switched to induce a reversal current through the inductor for providing the zero-voltage switching function. Control to output characteristics are identical to those of conventional buck and buck-boost converters. The invention provides efficient, high-frequency operation and isolation of the output from the input power source with minimal component volume. The control system is adaptable to constant frequency pulse width modulation for voltage regulation.

15 Claims, 6 Drawing Sheets

(a) SWITCH CONTROL (b) $V_{LP}$ (c) $I_{SC}$

(d) $I_{OUT}$ (e) $I_S$ (f) $I_{LP,MAG}$ $\frac{V_{IN}-nV_{OUT}}{L_P}DT = \frac{nV_{OUT}(1-D)T}{L_P}$ (g) $I_{LP,1-3}$ (h) $I_{LP,2}$ (i) $I_{LP}$

ZERO-VOLTAGE RESONANT TRANSITION SWITCHING POWER CONVERTER

The United States Government has a paid-up license in this invention and the right in limited circumstances to require the patent owner to license others on reasonable terms as provided for by the terms of a Contract No. F33615-86-C-1143 awarded by the United States Air Force.

BACKGROUND OF THE INVENTION

1. Field Of The Invention

The invention relates generally to DC-to-DC power converters and, more particularly, to power converters particularly adapted to zero-voltage resonant transition switching.

2. Description Of The Prior Art

Switching power supplies for converting DC voltages from one voltage level to another are well known in the art. Topologies such as buck switching, boost switching and buck-boost switching are also well known. However, when conversion from a relatively high DC voltage to a relatively low DC voltage is required, the efficiency of the prior art supplies suffers. This is particularly true of voltage converters operating at a frequency of 1 MHz or higher, where switching losses become significant.

Figure 1:
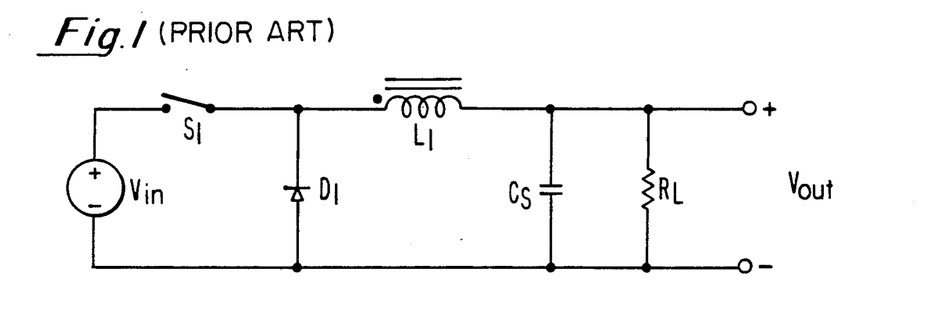
FIG. 1 is a schematic diagram of a prior art buck power converter.

FIG. 1 is a circuit illustrating a prior art buck (or forward) converter. During normal operation of the conventional buck converter, closing the semiconductor switch $S_1$ impresses the difference of the input voltage and output voltage across inductor $L_1$, causing the current in the inductor to increase and charging the output capacitor $C_s$ while also delivering current to any load connected to the output. When switch $S_1$ is turned off, the voltage at the junction between the switch and the inductor decreases until diode $D_1$ is forward-biased. Current then flows through the diode and the inductive element with a decreasing amplitude, until the switch $S_1$ is again closed and the cycle repeats.

Figure 2:
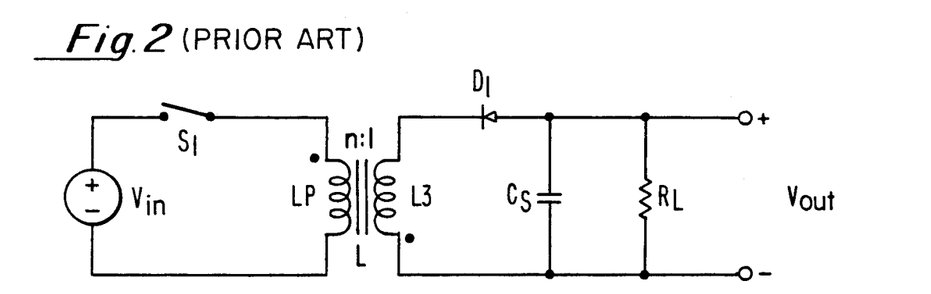
FIG. 2 is a schematic diagram of a prior art flyback power converter.

FIG. 2 shows a prior art circuit for a buck-boost converter, using a transformer L for isolating the input and output voltages. The buck-boost converter uses the same number of circuit components as does a buck or boost converter and permits attaining output voltage magnitudes that are either greater or less than that or the converter's input voltage. However, this versatility in voltage gain is attained at the expense of greater switching and diode currents than those of the basic buck or boost converters. This results in substantially higher commutation losses. Further discussions of the basic DC-to-DC converters are given in R. P. Severns and G. Bloom, "Modern DC-to-DC Switch Mode Power Converter Circuits", Van Nostrand Reinhold Company, Inc., 1985.

In U.S. Pat. No. 4,618,919, "Topology For Miniature Power Supply With Low Voltage and Low Ripple Requirements", invented by H. C. Martin, Jr., assigned to the assignee of the present invention, a dual transformer switching topology of the forward converter species provided isolation of the input and output power terminals as well as voltage transformation. However, this invention was of the interleaved flyback converter type, which requires a large number of components as compared to the simple flyback converter. Further, this converter may also be subject to commutation switching losses at high frequencies.

In a paper entitled "Zero-Voltage Switching In High Frequency Power Converters Using Pulse Width Modulation", by C. P. Henze, et al, IEEE Applied Power Electronics Conference (APEC) Record, pp. 33–40, February, 1988, a zero-voltage switching technique employing resonant transition during a switching interval of short but finite duration, for application to conventional power converter topologies, offered efficient operation at very high switching frequencies while retaining the fundamental characteristics of the conventional topology. Thus, power transistor parasitic capacitor switching losses are eliminated, and the voltage stress of the power transistor during changing state was not increased. These features were obtained at the expense of increased conduction losses and the requirement for synchronous rectification.

The present invention provides a single ended DC-DC power converter, which may operate with zero-voltage resonant transition switching at very high switching frequencies (1 MHz and greater). Only one magnetic element is required, which acts as both an inductor and a transformer. The turns ratio may be varied to obtain a desired voltage conversion ratio. Control-to-output characteristics are identical to conventional power converter topologies. The circuit inherently allows for zero-voltage resonant transition switching and magnetic isolation without making special demands on the magnetic element. It provides efficient, high-frequency operation and output isolation while using constant frequency pulse width modulation for control.

SUMMARY OF THE INVENTION

A power converter is comprised of an input coupleable to a source of DC potential, an output coupleable to a DC load, an electrical transformer having a primary winding coupled to the input and a secondary winding coupled to the output, a first capacitor coupled to the input and the primary winding, and a second capacitor coupled to the secondary winding and the output. It further comprises a first switch for coupling the first capacitor to the primary winding for exchanging stored energy between the first capacitor and the primary winding, a second switch operable in synchronism with the first switch and coupled to the secondary winding for applying at least a portion of the energy exchanged with the primary winding to the DC load, and a third switch operable for coupling the primary winding to the source of DC potential alternately and sequentially with the operation of the first and second switches, so that the first capacitor exchanges energy with the primary winding when the first switch is activated and the second capacitor exchanges energy with the secondary winding when the second switch is activated. The switches are controlled by means for selectively activating the first, second and third switches, the third switch being operable in opposition to the first and second switches, such that the switches are operated when the voltage drop therethrough is substantially zero.

BRIEF DESCRIPTIONS OF THE DRAWINGS

The present invention is illustrated by reference to the drawings in which like reference numerals refer to like elements of the invention.

DESCRIPTION OF THE PREFERRED EMBODIMENTS

Figure 3:
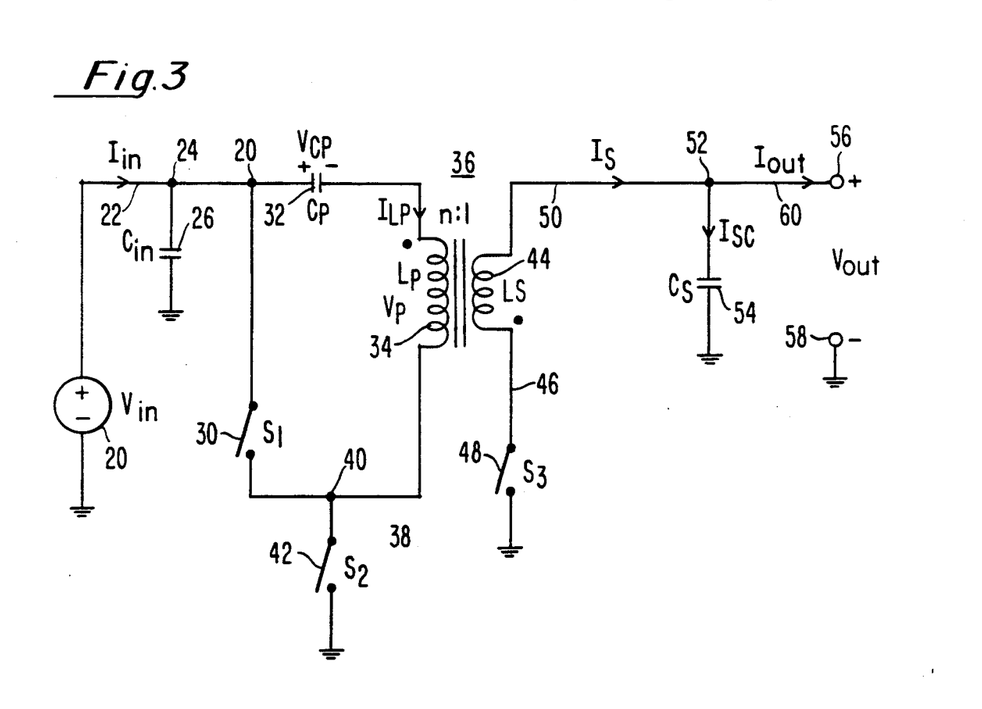
FIG. 3 is a schematic diagram of a flyback converter constructed in accordance with the present invention.

Referring now to FIG. 3, there is shown a series type power processing topology. The circuit employs three power switches, a two-winding transformer, and primary and secondary side filter capacitors. In the series type topology, the primary side filter capacitor and the primary winding of the inductor are connected in series and then connected to the input power source. For purposes of analysis, it is assumed that the capacitors are large enough so that the voltage developed is approximately constant over a switching interval, the inductor windings are coupled with a coupling of unity, and the power switches are ideal; that is, lossless and able to carry current in either direction. Moreover, it will be recognized by one skilled in the art that while only a single output version is considered in this analysis, multiples of the voltages may be obtained through the addition of windings, switches and capacitors operated as herein to be described.

As shown in the circuit of FIG. 3, a DC input power source 20 is coupled via lead 22 to node 24. Node 24 is connected to capacitor 26 and through node 28 to a first switch 30 and a series capacitor 32. A second terminal of capacitor 32 is connected to the primary winding 34 of a transformer 36. The return side of winding 34 is connected through a lead 38 to a node 40. Node 40 further connects to the fixed contact of switch 30 and to the moveable arm of switch 42. The fixed contact of switch 42 is connected to ground as is one side of capacitor 26 and the return side of the DC power supply 20.

Transformer 36 is further provided with a secondary winding 44, which connects through a lead 46 to the moveable arm of a third switch 48. The fixed contact of switch 48 is connected to ground. The secondary winding 44 is further connected through a lead 50 to a node 52 and to a capacitor 54 which also returns to ground. The output voltage of the converter appears at terminals 56 and 58; where terminal 56 is connected to node 52 by lead 60 and terminal 58 connects to ground.

The primary and secondary windings 34 and 44 are polarized in opposing directions as indicated by the dots on the respective windings. A conventional timing circuit (not shown) controls the operation of switches 30, 42 and 48 to provide the switching waveforms of FIG. 4. A suitable switch driver is shown in C. P. Henze, et al, "Interleaved Forward Converter Using Zero-Voltage Resonant Transition Switching For Distributed Power Processing", Power Electronics Seminar Proceedings, September, 1989, Virginia Power Electronics Center (VPEC), which is hereby incorporated by reference.

In operation, floating switch 30 and synchronous switch 48 are driven with the same drive signal such that they are either both on or both off as shown in FIG. 4(a). Power switch 42 is driven with an inverted drive signal such that when switches 30 and 48 are on, switch 42 is off, and vice versa. Since ideal switches are assumed for this analysis, the switching intervals are instantaneous and occur simultaneously. In practice, break-before-make switching with a short but finite switching interval, which may be of the order of 30–120 ns, is adopted in the implementation of zero-voltage resonant transition switching.

Figure 5:
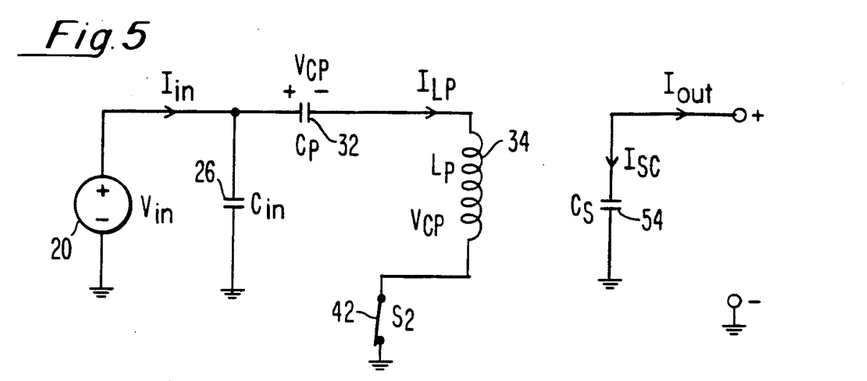
FIGS. 5 and 6 represent simplified schematic drawings of the switching stages of the converter of FIG. 3.
Figure 6:
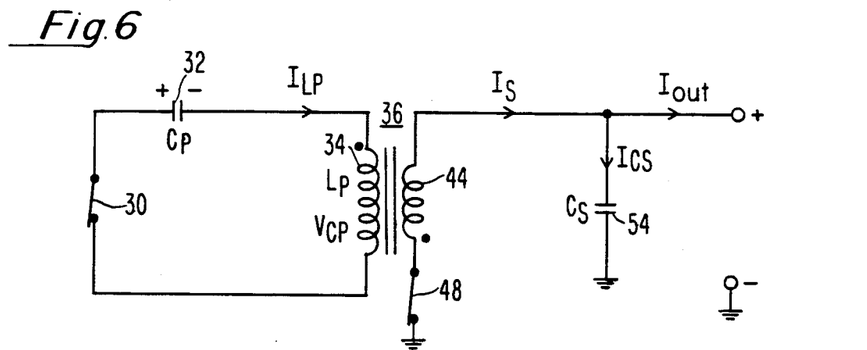

FIGS. 5 and 6 show the two states of the circuit of FIG. 3. Initially, it is assumed that the system has reached a settled operating condition. As shown in FIG. 5, power switch 42 is conducting, allowing the current in the primary winding 34 of transformer 36 to increase as capacitor 32 charges, while the output current $I_{out}$ is totally supported by the output filter capacitor 54. In the state shown in FIG. 6, the floating switch 30 and rectifier switch 48 are closed, allowing energy stored in capacitor 32 and inductor 34 to transfer from the primary side of the transformer to the secondary side to support the load (not shown).

Figure 4:
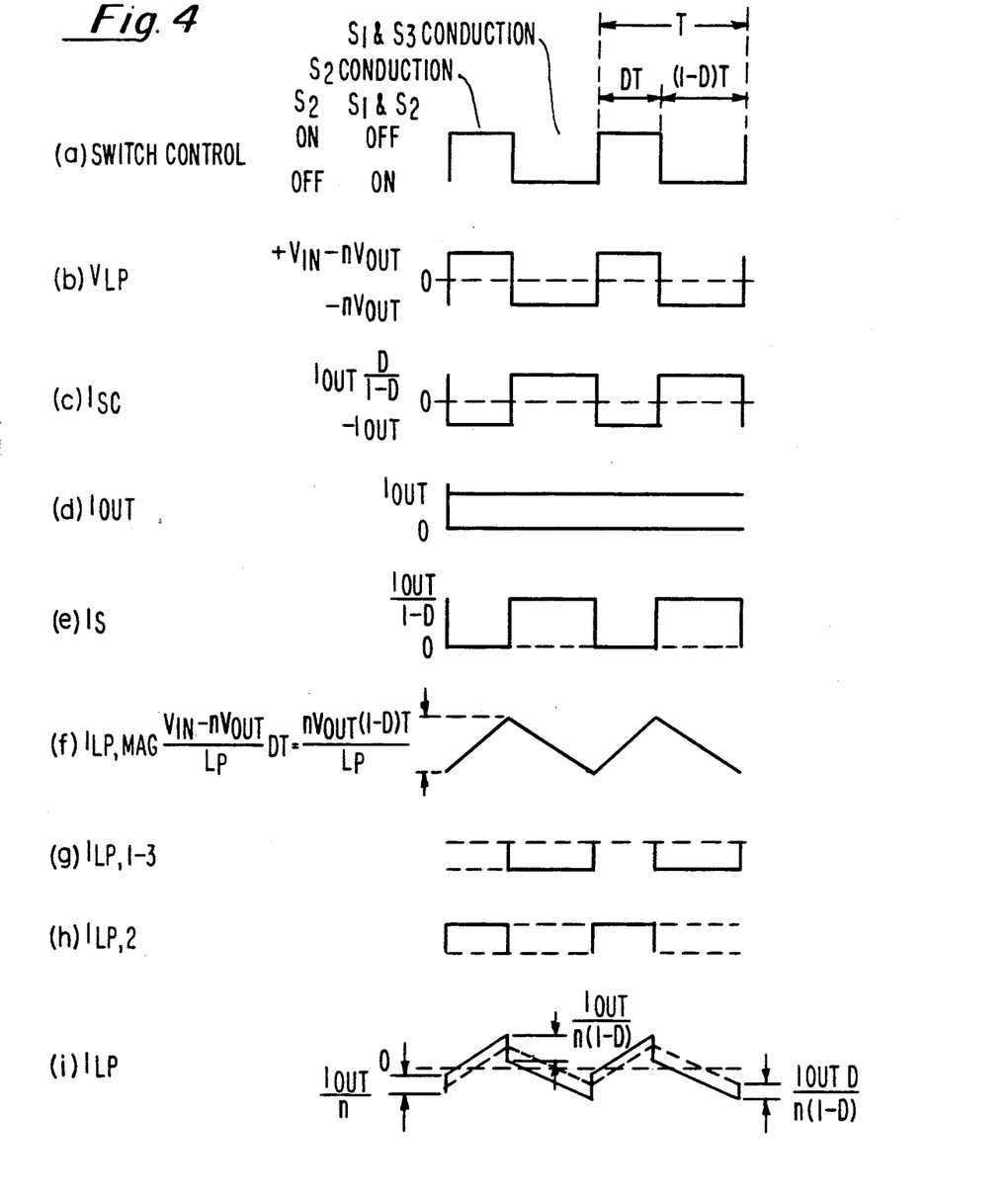
FIGS. 4(a)–4(i) show timing diagrams which illustrate the operation of the power converter of FIG. 3.

As defined in FIG. 4, the switch period is T with a fraction of operation DT during the conduction period of switch 42 and of $(1-D)T$ during the conduction period of switches 30 and 48. Since the voltage across the primary winding 34 must have an average value of zero over one switching interval when the circuit is operating in steady state, it may be shown that $$(V_{in} - nV_{out})DT - nV_{out}(1 - D)T = 0 \qquad (1)$$

$$V_{in}D = nV_{out} \qquad (2)$$

$$\frac{nV_{out}}{V_{in}} = D \qquad (3)$$

where T is the switching period, D is the fractional duty ratio of the power switch 42 and n is the normalized turns ratio of primary to secondary windings of transformer 36. It will clear to one skilled in the art that the voltage transfer of equation (3) is the familiar result for a buck-derived topology, and is shown in FIG. 4(b).

It is further known that the average current in the output capacitor 54 must be zero in the steady state. When power switch 42 is conducting, output capacitor 54 must supply the total load current $I_{out}$. When the floating and synchronous switches 30 and 48 are conducting, the current must reverse in the output capacitor 54 to replace the charge previously lost to the load. In an ideal case, it may be assumed that the current in capacitor 54 would be substantially rectangular as shown in FIG. 4(c). When power switch 42 is conducting, the output capacitor current $I_{sc}$ is equal and opposite to the output current $I_{out}$:

$$I_{SC} = -I_{out} \qquad (4)$$

During conduction of switches 30 and 46, the output capacitor current $I_{sc}$ is equal to the difference between the current in the secondary winding $I_s$ and the output current $I_{out}$. Thus:

$$I_{SC} = I_S - I_{out} \quad (5)$$

Since the average capacitor current must be zero, the secondary current $I_s$ may be found to be:

$$-DI_{out} + (1 - D)(I_S - I_{out}) = 0 \quad (6)$$

$$I_S = \frac{I_{out}}{1 - D} \quad (7)$$

During conduction of switches 30 and 48:

$$I_{SC} = \frac{I_{out}}{1 - D} - I_{out} \quad (8)$$

$$= I_{out} \frac{D}{1 - D} \quad (9)$$

Substituting equation 3 in equation 9 results in:

$$I_{SC} = I_{out} \frac{nV_{out}}{V_{in} - nV_{out}} \quad (10)$$

The output capacitor current $I_{sc}$ is shown in FIG. 4(c), and the output current $I_{out}$ in FIG. 4(d). The current $I_s$ through the secondary winding 44 is shown in FIG. 4(e).

By linear superposition, the current in the primary winding of the transformer is comprised of three components. The first component is the magnetizing current $I_LP_{,mag}$ which results from application of voltage across the primary winding by switch 42 an is independent of the output load current. The second component is the current through the secondary winding 44, which is reflected to the primary winding 34 during conduction by switches 30 and 48. This component is denoted as $I_LP_{,1-3}$. The third component is the input current contribution $I_LP_{,2}$ during conduction by switch 42.

The magnetizing current component is determined by the voltage applied to the transformer primary windings, the winding inductance, the switching period, and the switch duty ratio. When switch 42 is on, $$I_{LP,mag}(t) = I_{LP,mag}(t_o) + \frac{V_{in}}{L_P} t \quad (11)$$

The peak-to-peak magnetizing current during conduction by switch 42 is:

$$I_{LP,mag} = \frac{V_{in} - nV_{out}}{L_P} DT \quad (12)$$

The peak-to-peak current during conduction by switches 30 and 48 can be found using the same method:

$$I_{LP,mag} = \frac{nV_{out}}{L_P} (1 - D)T \quad (13)$$

Under steady state conditions, equations 12 and 13 must be equal. Setting equation 12 to 13 and simplifying results in equation (3).

The load current contribution to the primary current during conduction of switches 30 and 48, denoted by $I_LP_{,1-3}$, is found by reflecting equation (7) to the primary side by the turns ratio n of the transformer.

$$I_{LP,1-3} = \frac{I_S}{n} = \frac{I_{out}}{n(1 - D)} \quad (14)$$

The load current contribution to the primary current during conduction by switch 42, $I_LP_{,2}$, is found by considering the input current that must flow during closure of switch 42 to support the output current. Since the output energy must be equal to the input energy for an ideal lossless transformer, and since the instantaneous power is derived from the product of voltage and current, from equation (3) we require that:

$$\frac{I_{out}}{nI_{in}} = \frac{1}{D} \quad (15)$$

Rearranging equation (15) results in:

$$I_{in} = \frac{I_{out}D}{n} \quad (16)$$

The average load current contribution to the primary current during conduction by power switch 42 over one switching cycle must be equal to the input current $I_{in}$.

$$I_{LP,2}D = I_{in} = \frac{I_{out}D}{n} \quad (17)$$

This may be reduced to:

$$I_{LP,2} = \frac{I_{out}}{n} \quad (18)$$

The primary winding magnetizing current $I_LP_{,mag}$ has a triangular wave shape as shown in FIG. 4(f). The load current contribution waveforms found from equations (14) and (18) are shown in FIGS. 4(g) and 4(h), respectively. The resulting primary current waveform is shown in FIG. 4(i) by combining FIGS. 4(f), 4(g), and 4(h). Note that $I_LP_{,2}$ will remain substantially constant throughout the switching cycle even though power switch 42 is off, due to the large inductance of the primary winding.

If there is no output current, the magnetizing current will have an average value of zero. Therefore, when the transformer is unloaded, the primary current waveform will have positive and negative peaks of equal amplitude. Further, to obtain zero-voltage resonant transition switching, the magnetizing current must have a peak-to-peak amplitude greater than twice the load current contributions to the primary inductor current $I_LP$.

The series type power processing circuit topology differs from the prior art isolated buck derived topology in that only a single magnetic element is used in a forward converter circuit. This single magnetic element acts to provide both the circuit inductance and the isolation transformer. Furthermore, zero-voltage resonant transition switching on the primary side is readily implemented since winding 34 feeds current into the junction point of both primary side switches 30 and 42, thereby facilitating the charging and discharging of capacitor 32 through the primary winding. It should be further noted that if a high coupling coefficient transformer is used, of the order of 0.95, zero-voltage resonant transition switching will also be obtained at the secondary switch 48 by virtue of the coupling of reactive energy from the primary side of the transformer.

Figure 7:
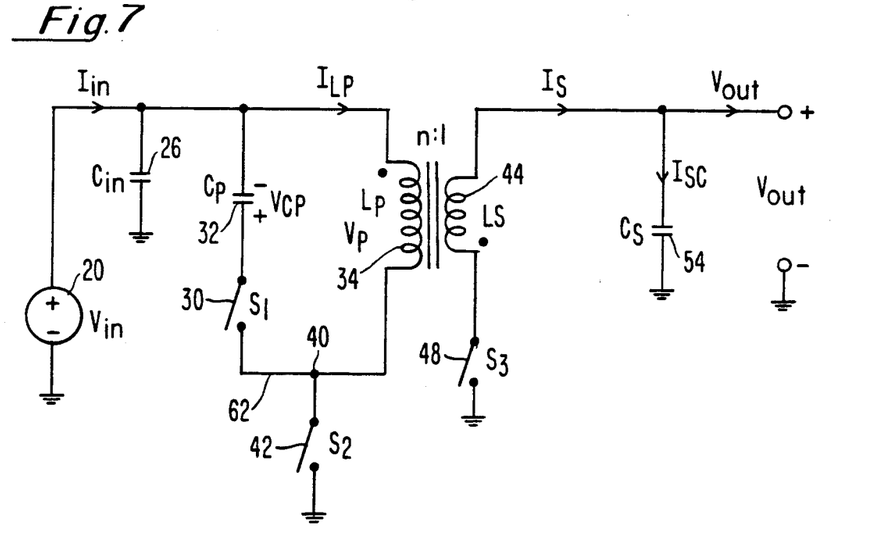
FIG. 7 is a schematic drawing of a further embodiment of the invention.
Figure 8:
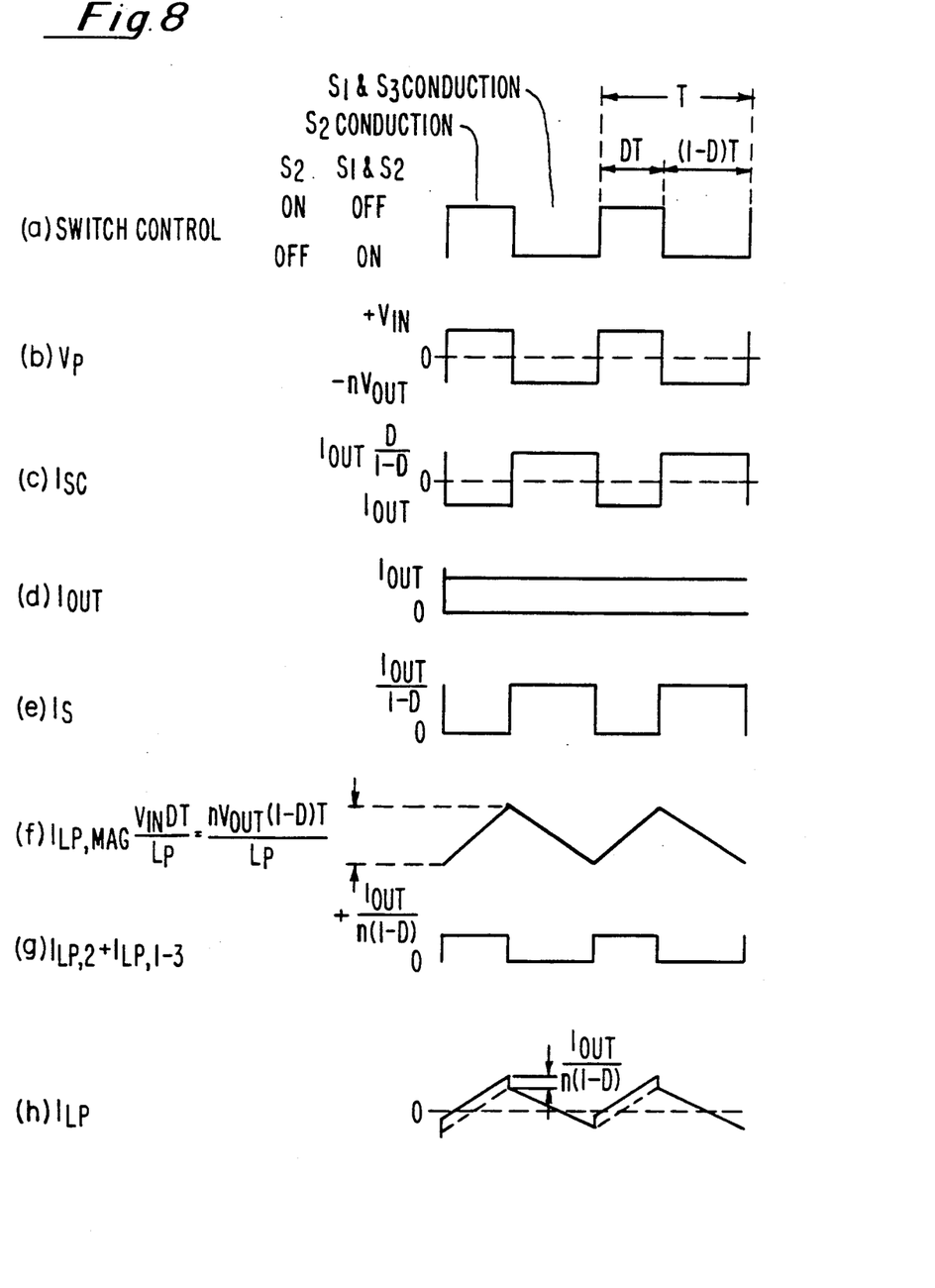
FIGS. 8(a)–8(h) are timing diagrams illustrating the operation of the power converter of FIG. 7.
Figure 9:
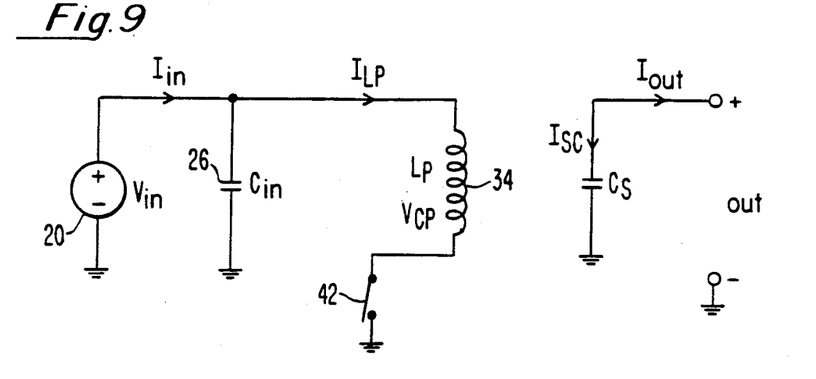
FIGS. 9 and 10 are simplified schematics showing the switching stages of the converter of FIG. 7.
Figure 10:
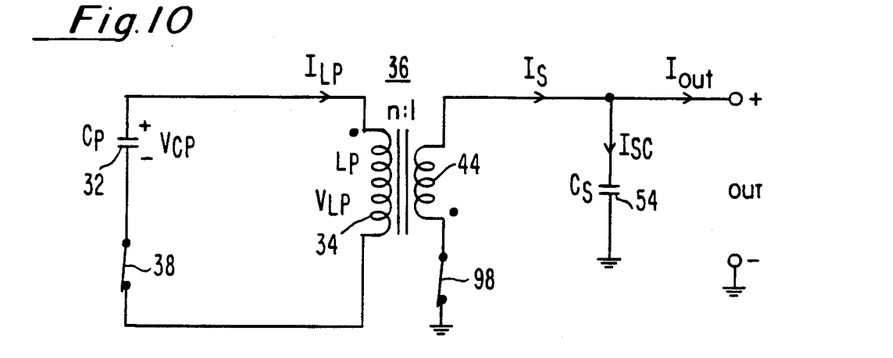

Referring now to FIG. 7, there is shown an alternate embodiment of the invention using a parallel capacitor configuration. The structure and operation is substantially similar to that of the embodiment of FIG. 3 except that capacitor 32 is selectively connected for parallel switching through switch 30, lead 62 and node 40 to primary winding 34 and power switch 42. The waveforms generated by the circuit of FIG. 7 are shown in FIG. 8. The operational states are shown in FIG. 9 and FIG. 10, respectively. In FIG. 9, the power switch 42 is on, thus allowing the current in the primary winding 34 to increase while the output current is totally supported by the output filter capacitor 54. In FIG. 10, the synchronized switches 30 and 48 are conducting, so that the voltage supplied by capacitor 32, which was previously charged as a result of the continual charging and discharging of capacitor 32 as switches 30 and 42 are opened and closed, eventually produces a residual charge and voltage, which is applied to the primary winding 34 of transformer 36.

Since the voltage across the primary inductor winding 34 may be shown to have an average value of zero over one switching interval if the circuit is operating in steady state, then:

$$V_{in}DT + (-nV_{out})(1 - D)T = 0 \quad (19)$$

$$nV_{out}(D - 1) + V_{in}D = 0 \quad (20)$$

$$\frac{nV_{out}}{V_{in}} = \frac{D}{1 - D} \quad (21)$$

where the parameters are as defined above. The voltage transfer function of equation (21) is the familiar result for a flyback-derived topology and is shown in FIG. 8(b). From equation (9) and equation (21), their results $$I_{sc} = I_{out} \frac{nV_{out}}{V_{in}} \quad (22)$$

The current through the output capacitor $I_{sc}$ is shown in FIG. 8(c). The output current $I_{out}$ is shown in FIG. 8(d) and the secondary current $I_s$ is shown in FIG. 8(e).

The magnetizing current during power switch 42 conduction is $$I_{LP,mag}(t) = I_{LP,mag}(t_o) + \frac{V_{in}}{L_P} t \quad (23)$$

The peak-to-peak swing in magnetizing current during switch 42 conduction is $$I_{LP,mag} = \frac{V_{in}}{L_P} DT \quad (24)$$

In a similar manner, the peak-to-peak current during conduction of switches 30 and 48 is found to be $$I_{LP,mag} = \frac{nV_{out}}{L_P} (1 - D)T \quad (25)$$

This is shown in the waveform of FIG. 8(f). Reflecting equation (7) to the primary side of transformer 36 results in equation (14).

The load current contribution to the primary current during conduction by switch 42, using equation (21) results in $$\frac{I_{out}}{nI_{in}} = \frac{1 - D}{D} \quad (27)$$

which may be rearranged to provide $$I_{in} = \frac{I_{out}D}{n(1 - D)} \quad (28)$$

The average of load current contributed to the primary current during conduction by switch 42 over one switching cycle must be equal to the input current $I_{in}$ $$I_{LP,2}D = I_{in} = \frac{I_{out}D}{n(1 - D)} \quad (29)$$

This may be simplified to provide $$I_{LP,2} = \frac{I_{out}}{n(1 - D)} \quad (30)$$

as shown in FIG. 8(g).

The primary winding magnetizing current $I_{LP,mag}$ has a triangular wave shape shown in FIG. 8(f). The load current contribution waveform found by combining the results of equation (26) and equation (30) is shown in FIG. 8(g). The resulting primary current wave form $I_{LP}$ is shown in FIG. 8(h).

As in the case of the forward converter, when the output current is zero, the magnetizing current is the only current in the primary winding and must have an average value of zero. Therefore, when unloaded, the primary current waveform will have positive and negative peaks of equal value. This circuit differs from the prior art flyback converter of FIG. 2 in that the prior art circuit has no magnetizing current in the primary winding during the interval when the power source is interrupted, while in the present invention, capacitor 34 provides a magnetizing current, even though no power is being applied by the DC power source during that interval. The parallel type of power processing circuit will operate with zero-voltage resonant transition switching, providing that the aforementioned relationships between the values of magnetizing and load currents, and break-before-make drive signals, appropriately timed, are used, with respect to the primary side winding, without placing any special requirements on the coupling coefficient of the transformer. By providing a high coupling coefficient, zero-voltage resonant transition switching will also occur on the secondary side.

Figure 11:
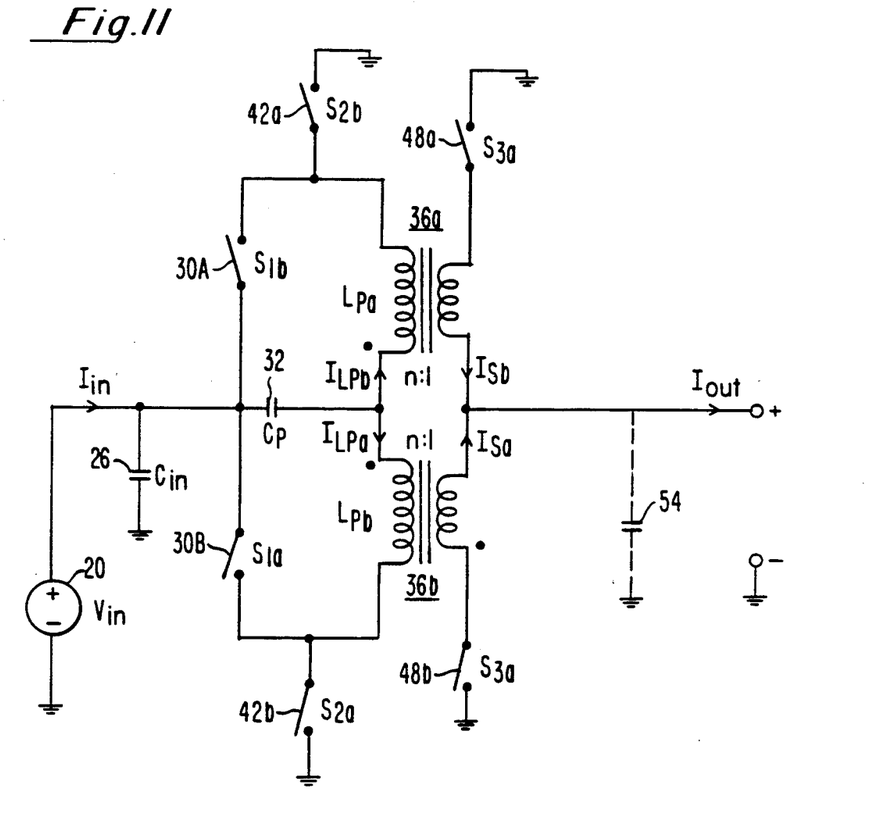
FIG. 11 is a schematic diagram showing the application of the power converter of FIG. 3 in an interleaved forward topology.

FIG. 11 shows an embodiment wherein two series type power processing DC-to-DC converters are connected in parallel and operated with a 180 degree phase shift to obtain an interleaved forward power converter. The primary side filter capacitor 26 and the series capacitor 32 are common to both sides of the converter. If the power switch duty ratio is restricted to values of fifty percent or less, the output side filter capacitor 54 may be eliminated since the primary side filter capacitor 26 is always coupled to the output through one or both of the converter circuits. In general, the interleaving scheme shown herein may be extended to any number of series type power processing circuits.

Figure 12:
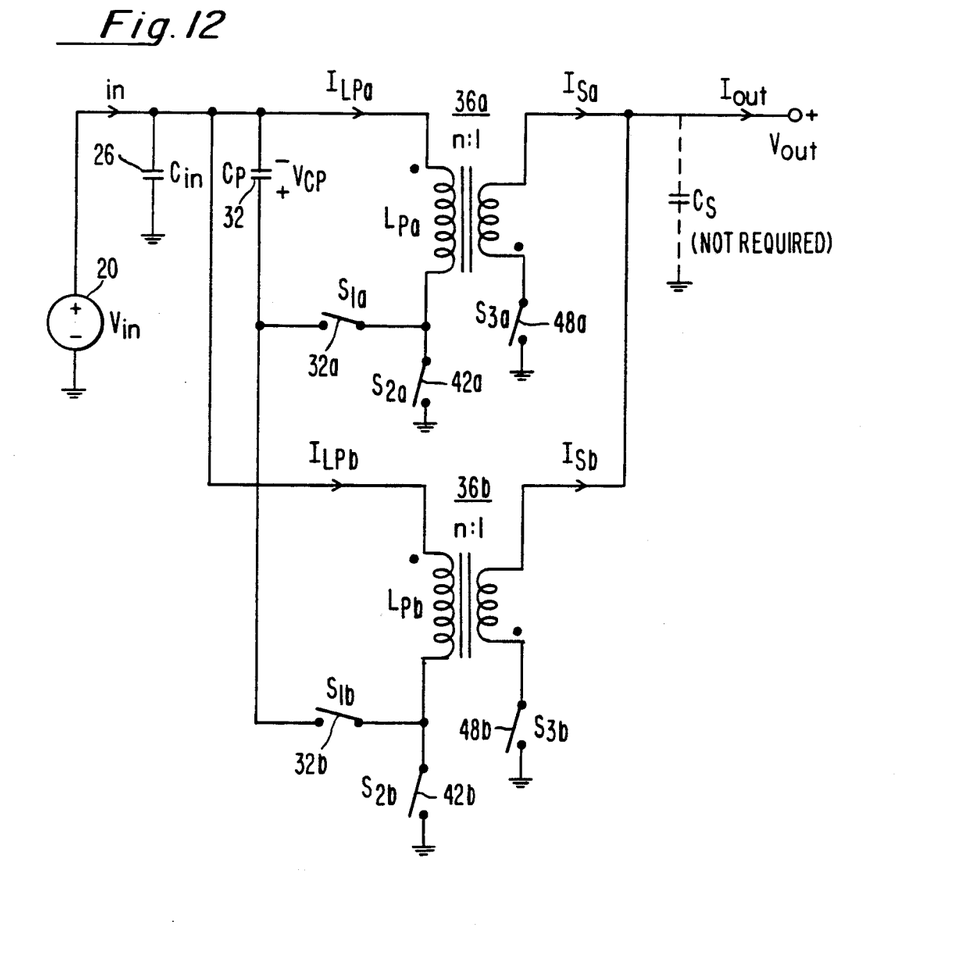
FIG. 12 is a schematic diagram showing the implementation of the converter of FIG. 7 in an interleaved flyback converter topology.

In a similar manner, FIG. 12 shows a parallel type power processing circuit utilizing an interleaved flyback power converter. This circuit is substantially similar to that shown in said U.S. Pat. No. 4,618,919 except that the inductance and timing parameters are defined to provide for zero-voltage reactive switching.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A power converter, comprising:
   an input coupleable to a source of DC potential,
   an output coupleable to a DC load,
   an electrical transformer having a primary winding coupled to said input and a secondary winding coupled to said output,
   a first capacitor coupled to said input and said primary winding,
   a second capacitor coupled to said secondary winding and said output,
   first switch means for coupling said first capacitor to said primary winding for exchanging stored energy between said first capacitor and said primary winding,
   second switch means operable in synchronization with said first switch means and coupled to said secondary winding for applying at least a portion of said exchanged energy to said DC load,
   third switch means operable for coupling said primary winding to said source of DC potential alternately and sequentially with the operation of said first and second switch means, so that said first capacitor exchanges energy with said primary winding when said first switch means is activated, and said second capacitor exchanges energy with said secondary winding when said second switch means is activated, and
   control means for selectively activating said first, second and third switch means, such that said switches are operated when the voltage drop therethrough is substantially zero, said third switch means being operable in opposition to said first and second switch means.

2. A power converter as set forth in claim 1, wherein said first capacitor is coupled in series with said primary winding and said source of DC potential and discharged through said primary winding when said first switch means is closed.

3. A power converter as set forth in claim 2, wherein said second capacitor is coupled in series with said secondary winding and said second switch mean and charged when said second switch means is closed and discharged when said second switch means is opened.

4. A power converter as set forth in claim 2, wherein said first capacitor is further coupled in series with said first switch means and charged when said third switch means is closed and discharged when said third switch mean is opened.

5. A power converter as set forth in claim 4, wherein said first, second and third switch means comprise semiconductor means.

6. A power converter as set forth in claim 5, wherein said semiconductor means comprises a field effect transistor.

7. A power converter as set forth in claim 3, wherein said first switch means and said first capacitor means have a common connection to said source of DC potential.

8. A power converter as set forth in claim 7, wherein said second capacitor and said secondary winding have a common connection to said output.

9. A power converter as set forth in claim 8, wherein said secondary winding and said second switch means have a common connection.

10. A power converter, comprising:
    first electrical transformer means having a primary winding and a secondary winding,
    second electrical transformer means having a primary winding and a secondary winding,
    an input for coupling said primary windings of said first and second transformers to a DC power source,
    an output for coupling said secondary windings of said first and second transformers to a DC load,
    a capacitor coupled to said input and to said primary windings of said first and second electrical transformer means for producing an electrical signal,
    switch means for selectively connecting at least one of said primary windings to said capacitor to receive said electrical signal therefrom and selectively connecting at least one of said primary windings to said DC power source when said selected winding is not connected to said first capacitor, and for selectively connecting at least one of said secondary windings to said output when a primary winding of a corresponding transformer means is connected to said first capacitor.

11. A power converter as set forth in claim 10, further comprising a second capacitor coupled to said secondary windings of said first and second electrical transformers.

12. A power converter, comprising:
    first electrical transformer means having a primary winding and a secondary winding,
    second electrical transformer means having a primary winding and a secondary winding,
    a capacitor for producing an electrical signal coupled to said first and second primary windings,
    an input for coupling said capacitor to a DC power source,
    an output for coupling said secondary windings of said first and second electrical transformers to a DC load,
    switch means for selectively connecting at least one of said primary windings to said capacitor to receive said electrical signal therefrom and selectively connecting at least one of said primary windings to said DC power source when said primary winding is not connected to said capacitor, and further for selectively connecting at least one of said secondary windings to said output when a predetermined primary winding of one of said first or second transformer means is connected to return said electrical signal from said capacitor, and
    control means for selectively activating said switch means such that said switch means is operated when the voltage drop therefrom is substantially zero, and for synchronously coupling said primary windings of said first or second transformer means to said capacitor and said secondary windings of said first or second transformer means to said output alternately and sequentially with connecting said primary windings to said power source and disconnecting said capacitor from said primary winding and said secondary windings from said output.

13. A power converter as set forth in claim 12 wherein said capacitor is selectively connected in series with each of said primary windings and said power source.

14. A power converter as set forth in claim 12 wherein said capacitor is selectively connected in parallel with at least one of said primary windings.

15. A method for converting a first DC voltage at a source to a second DC voltage at an output, comprising the steps of:

supplying current from the source to a primary winding of a transformer by turning on a first semiconductor switch coupled to the primary winding and the power source, turning off the semiconductor switch, supplying current from the primary winding to a secondary winding of the transformer via conduction through an energy storage device coupled to said primary winding by a second semiconductor switch which is coupled to said power source, supporting the output DC voltage with a further energy storage device which receives current from the secondary winding of said transformer via conduction through a third semiconductor device which is coupled to said output, and permitting the energy stored in said first named energy storage device to effect a reversal of current flow through said primary winding while synchronously opening and closing said first and third semiconductor switches and sequentially operating said second semiconductor switch in opposition to said first and third switches so that current flowing in said first and third semiconductor switches is substantially zero at the time of switching.

* * * * *